Figure 1:
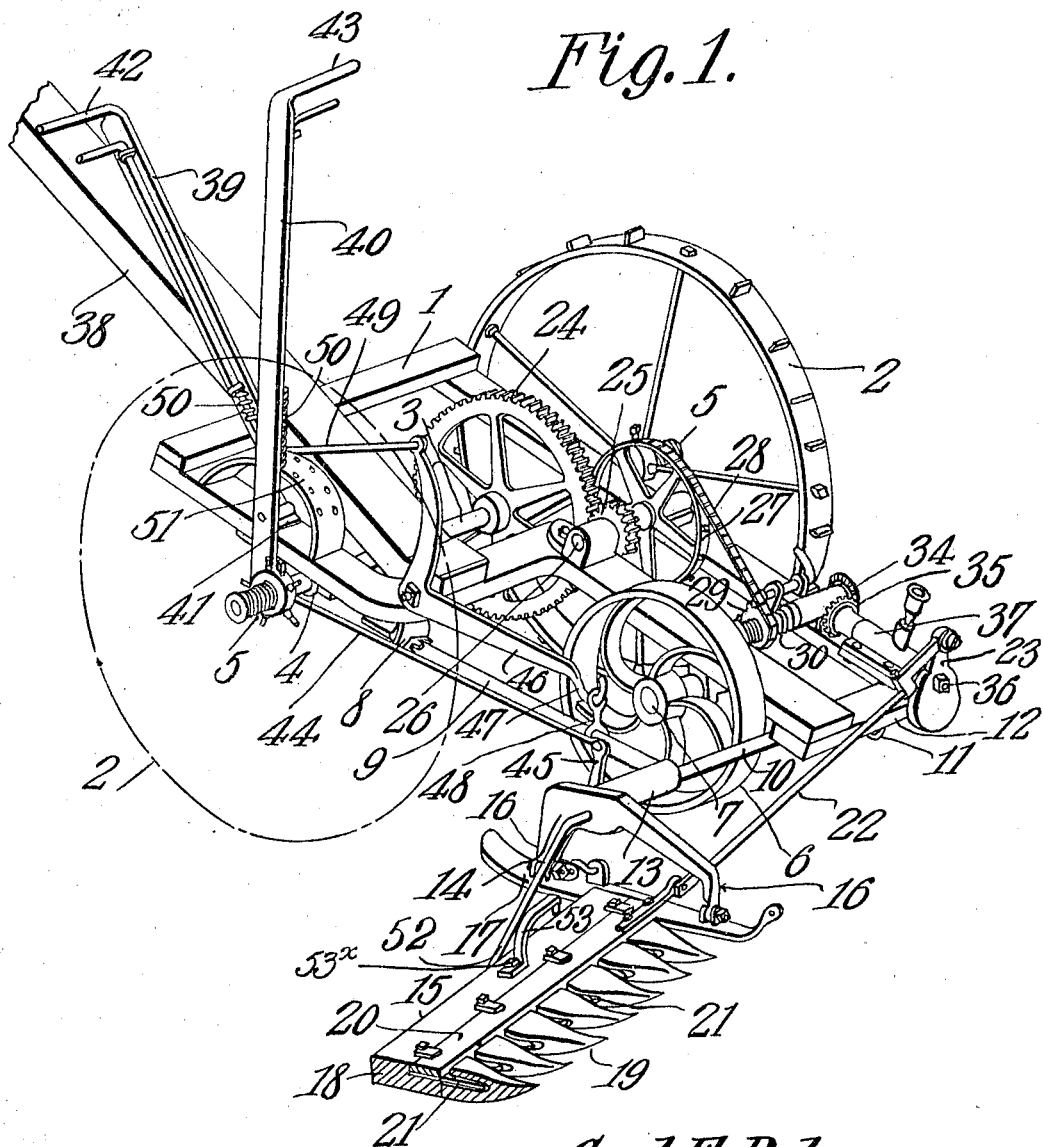

C. E. PETERSON.
LAWN MOWER.
APPLICATION FILED MAY 19, 1908.

945,191.

Patented Jan. 4, 1910.
2 SHEETS—SHEET 1.

Carl E. Peterson
Inventor.

Witnesses

By C. A. Snow & Co.
Attorneys

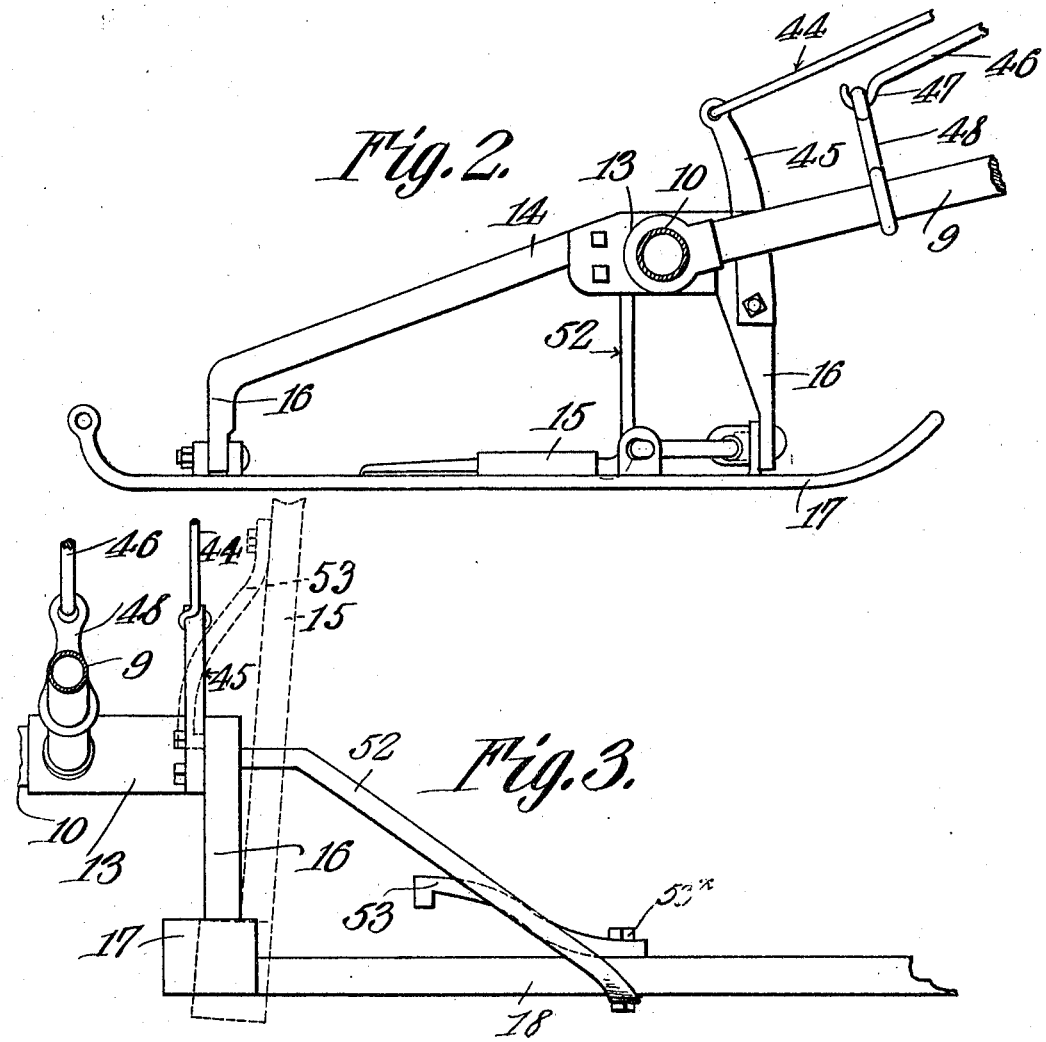

UNITED STATES PATENT OFFICE.

CARL E. PETERSON, OF ST. JAMES, MINNESOTA, ASSIGNOR TO HANS M. SERKLAND, OF ST. JAMES, MINNESOTA.

LAWN-MOWER.

945,191.     Specification of Letters Patent.    Patented Jan. 4, 1910.

Application filed May 19, 1908. Serial No. 433,703.

*To all whom it may concern:*

Be it known that I, CARL E. PETERSON, a citizen of the United States, residing at St. James, in the county of Watonwan and State of Minnesota, have invented a new and useful Lawn-Mower, of which the following is a specification.

This invention relates to lawn mowers; and has for its object to provide a strong and efficient implement of that type employing a reciprocating sickle projecting laterally from one side of the frame, as the cutting means. The sickle or cutter bar is suitably carried on a finger bar from the forward edge of which the guard fingers project in the usual manner. Driving mechanism operated by the ground wheels transmits motion to the cutter bar, and means are provided for raising, lowering and tilting the finger bar for the purpose of adjusting the cutter to the most advantageous position.

With the above and other objects in view, as will appear as the nature of the invention is better understood, the same consists in the novel construction and arrangement of parts of a lawn mower, as will be hereinafter fully described and claimed.

In the accompanying drawings forming a part of this specification, and in which like characters of reference indicate corresponding parts:—Figure 1 is a view in perspective of a lawn mower constructed in accordance with the present invention, with a portion of the cutting mechanism, one of the drive wheels and the outer end of the handle broken away. Fig. 2 is a detailed sectional view, showing the connection between the arm, the sleeve and the bracket. Fig. 3, is a similar view to Fig. 2 taken at right angles thereto, the knife being shown in elevated position by dotted lines.

In the drawing, 1 indicates a flat inclined skeleton frame supported at its rear end on ground wheels 2 mounted outside the frame on the ends of a transverse horizontal shaft 3 journaled in bearings 4 fastened on the under side of the frame 1. The ground wheels 2 are connected to the shaft 3 by means of any well known form of ratchet or clutch mechanisms, indicated generally by 5, which turn the shaft 3 when the mower is moved forwardly but permit the wheels to rotate freely on the shaft when drawn rearwardly, as usual. The forward end of the frame 1 is supported by a small wheel 6 mounted on a shaft 7 projecting from a bracket bolted on the under side of the frame, and holds said frame at the proper inclination.

Bolted on one side of the frame 1, in this instance the right side, is a bracket 8 in which is pivoted a forwardly projecting arm 9 having at its front end a cross arm 10 perpendicular thereto, one end of which arm 10 is hinged at 11 to the under side of the forward transverse bar 12 of the frame 1. The opposite end of the cross arm is journaled in a sleeve 13 projecting inwardly from a bracket 14 on which the cutting mechanism 15 is hinged. The bracket 14 is provided with two downwardly projecting arms 16, each having a boss on its end for pivotal attachment to upstanding lugs on the inner shoe 17 of the cutting mechanism.

The cutting mechanism 15 is of the usual type and comprises a finger bar 18 with forwardly projecting guard fingers 19, and a cutter bar 20 carrying knives 21 which reciprocate between the guard fingers when the cutter bar is operated by a pitman 22 pivoted thereto and to one end of a crank 23 when the latter is rotated.

A gear wheel 24 is mounted on the driving shaft 3 and engages a smaller gear wheel 25 fast on a short cross shaft 26 rotating in bearings on top of the frame 1. A sprocket wheel 27 is also secured on the shaft 26 and, by means of a chain 28, turns a smaller sprocket wheel 29 loosely mounted on a second short cross shaft 30 rotatably mounted on the frame 1 in advance of the shaft 26. A suitable clutch mechanism is provided for connecting the sprocket wheel 29 to the shaft 30. A miter gear 34 is keyed on the outer end of the cross shaft 30 and meshes with a similar gear 35 on a shaft 36 journaled in a long bearing 37 attached to the left side bar of the frame 1 parallel thereto. On this shaft 36, which projects beyond the front of the frame 1, is mounted the crank 23 heretofore mentioned.

Near the right side of the frame 1 and fastened thereto is an upwardly and rearwardly projecting handle 38 by means of which the mower is moved over the ground. On the right of the handle 38 are two hand levers 39 and 40 fulcrumed in a common bearing 41 bolted on the top of the right frame bar, one of said levers being on the inner side and the other on the outer side of said frame bar. The inner hand lever 39 is fulcrumed at its lower end and has a hand grip 42 on its upper end projecting outwardly. The hand lever 40 has its fulcrum point intermediate its ends but near its lower end, its upper end also has a hand grip 43 turned inwardly. One of said levers is longer than the other so that the hand grip of one may pass over that of the other. A connecting rod 44 extends from the lower arm of the lever 40 forwardly to an arm 45 projecting upwardly from the bracket 14 on which the cutting mechanism is hinged. Operating the lever 40 therefore causes the bracket 14 to rock on the cross arm 10 and raise or lower the cutter bar and guard fingers.

Fulcrumed on the right side of the frame 1 above the bracket 8 is an elbow lever 46, one arm of which extends upwardly and the other in a forward direction, terminating in a hook 47 on which hangs a link 48 surrounding the forwardly projecting arm 9 a short distance back from its connection with the cross arm 10. A rod 49 extends from the end of the upright arm of the elbow lever 46 to the hand lever 39 above its fulcrum, and there pivotally attached. Movement of the lever 39 operates the elbow lever, and, through the arms 9 and 10, the inner bracket 14 and cutting mechanism hinged thereto are elevated bodily.

The levers 39 and 40 are each provided with a locking bolt 50 adapted to enter suitably disposed openings in a curved lock plate 51, the usual means being provided for operating said bolts.

The cutting mechanism is held in horizontal position by a brace arm 52 extending from the bracket 14 to the under side of the finger bar 18, and it is there fastened by a bolt 53ˣ, which passes through the finger-bar, and also secures on the upper side thereof a spring catch 53, which engages with said bracket and holds the cutting mechanism in a substantially vertical position when the brace arm is disconnected, and the cutting mechanism raised by hand.

The bearings 4 for the main shaft 3 are preferably roller bearings while the remaining shafts of the driving gear turn in ball bearings.

What is claimed is:—

In a mower, a main frame, a coupling frame, a bracket carried by the coupling frame and rocking thereon, a cutting mechanism hinged to the bracket, means for raising and lowering the coupling frame, means for rocking the bracket, and a brace between the bracket and the cutting mechanism, said brace being detachably connected to the latter.

In testimony that I claim the foregoing as my own, I have hereto affixed my signature in the presence of two witnesses.

CARL E. PETERSON.

Witnesses:
J. W. SOMERS,
M. W. SANDQUIST.